US012776128B2

(12) United States Patent
Gerwe et al.

(10) Patent No.: US 12,776,128 B2
(45) Date of Patent: Oct. 27, 2026

(54) IMAGE PROCESSING SYSTEM FOR DETERMINING SATELLITE CONFIGURATION AND PROPERTIES

(71) Applicant: The Boeing Company, Arlington, VA (US)

(72) Inventors: David Roderick Gerwe, West Hills, CA (US); Klaus Zhang Okkelberg, Torrance, CA (US)

(73) Assignee: The Boeing Company, Arlington, VA (US)

( * ) Notice: Subject to any disclaimer, the term of this patent is extended or adjusted under 35 U.S.C. 154(b) by 244 days.

(21) Appl. No.: 18/632,048

(22) Filed: Apr. 10, 2024

(65) Prior Publication Data

US 2025/0322643 A1 Oct. 16, 2025

(51) Int. Cl.

*G06V 10/764* (2022.01)
*G06T 3/40* (2024.01)
*G06T 7/10* (2017.01)

(52) U.S. Cl.

CPC .............. *G06V 10/764* (2022.01); *G06T 3/40* (2013.01); *G06T 7/10* (2017.01); *G06T 2207/20084* (2013.01)

(58) Field of Classification Search

CPC ........... G06T 15/20; G06T 2207/20084; G06T 2207/10032; G06T 2219/004; G06T 7/10; G06T 7/11; G06T 7/13; G06T 3/40; G06V 10/26; G06V 20/13; G06V 10/764; G06V 10/82; G06V 10/40; G06V 20/70;

(Continued)

(56) References Cited

U.S. PATENT DOCUMENTS 12,340,576 B2 * 6/2025 Desai .................. G06F 18/2148
2012/0035887 A1 2/2012 Augenbraun et al.

(Continued)

FOREIGN PATENT DOCUMENTS

CN 113486894 A 10/2021

OTHER PUBLICATIONS

Armstrong, W. et al., "Semantic Image Segmentation of Imagery of Unmanned Spacecraft Using Synthetic Data," Deep Learning, Autumn 2021, 7 pages.

(Continued)

*Primary Examiner* — Courtney Joan Nelson
(74) *Attorney, Agent, or Firm* — Alleman Hall LLP

(57) ABSTRACT

A method for satellite component classification includes, at a satellite classification system, receiving a test image depicting a satellite, the satellite having a hardware component configuration that is unknown to the satellite classification system. The test image is input to a satellite classification model trained, based at least in part on a plurality of training satellite images, to generate output image segmentation maps for input satellite images. The satellite classification model outputs an output image segmentation map for the test image, one or more position parameters for the satellite, and one or more attitude parameters for the satellite. The output segmentation map includes a plurality of map pixels corresponding to a plurality of image pixels in the test image, wherein pixel values of the plurality of map pixels classify corresponding image pixels of the test image as depicting different hardware components of the satellite.

20 Claims, 7 Drawing Sheets

(58) Field of Classification Search
CPC .... G06V 10/778; G06V 10/806; G06V 10/44; G06N 3/0464; G06N 3/08; G06N 20/00; G06F 2218/08; G06F 2218/12; G06F 18/213
See application file for complete search history.

(56) References Cited

U.S. PATENT DOCUMENTS

| | | | | |
|---|---|---|---|---|
| 2014/0313345 | A1* | 10/2014 | Conard | G06V 20/10 348/169 |
| 2018/0170122 | A1 | 6/2018 | Kawakami | |
| 2019/0347382 | A1 | 11/2019 | Stoddart et al. | |
| 2020/0010220 | A1 | 1/2020 | Fraze | |
| 2021/0184362 | A1 | 6/2021 | Hong Loh et al. | |
| 2022/0161424 | A1 | 5/2022 | Guo | |
| 2022/0317314 | A1 | 10/2022 | Umegaki et al. | |
| 2022/0365255 | A1 | 11/2022 | Yu et al. | |
| 2023/0410843 | A1 | 12/2023 | Cheng et al. | |
| 2024/0062166 | A1 | 2/2024 | List et al. | |

OTHER PUBLICATIONS

European Patent Office, Extended European Search Report Issued in Application No. 25163424.2, Jul. 3, 2025, 7 pages.

European Patent Office, Extended European Search Report Issued in Application No. 25163425.9, Jul. 1, 2025, 9 pages.

Park, T. et al., "Robust Multi-task Learning and Online Refinement for Spacecraft Pose Estimation across Domain Gap," Advances in Space Research, vol. 73, Issue 11, Jun. 1, 2024, 16 pages.

Dolf Veenvliet, Random generator for space ships, ShapeWright.com, Available Online at www.ship.shapewright.com, Nov. 2, 2011, 1 pages.

Reichsfuhrer_Grammer, "A cool tool to generate random 3D spaceships for your universe," Reddit r/worldbuilding, Available Online at https://web.archive.org/web/20171024135930/https://www.reddit.com/r/worldbuilding/coments/12rurl/a_cool_tool_to_generate_random_3d_spaceships_for/, Oct. 24, 2017, 1 pages.

Park, T. et al., "SPEED+: Next-Generation Dataset for Spacecraft Pose Estimation across Domain Gap," Proceedings of IEEE Aerospace Conference, Mar. 5, 2022, Big Sky, MT, 15 pages.

Kisantal, M. et al., "Satellite Pose Estimation Challenge: Dataset, Competition Design and Results," IEEE Transactions on Aerospace and Electronic Systems, vol. 56, No. 5, Apr. 22, 2020, 15 pages.

Chen, B. et al., "Satellite Pose Estimation with Deep Landmark Regression and Nonlinear Pose Refinement," arXiv:1908.11542v1, Aug. 30, 2019, 9 pages.

Cassinis, L. et al., "On-Ground Validation of a Cnn-Based Monocular Pose Estimation System for Uncooperative Spacecraft," Proceedings of European Conference on Space Debris, Apr. 20, 2021, Virtual, 14 pages.

Okkelberg, K. et al., "Self-Supervised Auxiliary Task Learning for Estimating Satellite Orientation," Proceedings of Advanced Maui Optical and Space Surveillance Technologies Conference, Sep. 17, 2024, Maui, HI, 9 pages.

* cited by examiner

IMAGE PROCESSING SYSTEM FOR DETERMINING SATELLITE CONFIGURATION AND PROPERTIES

FIELD

The invention relates generally to determining a satellite's geometric configuration, type, position, attitude, and/or other properties from imagery depicting the satellite.

BACKGROUND

Machine vision refers to computer-based techniques for determining information about an object or environment from images. As examples, machine vision can be applied to robotics, autonomous driving, and/or manufacturing. In machine vision scenarios, images from a camera are processed to extract information about objects in the picture, such as object type, position, context, etc. Such information can be used for any suitable purpose, such as feedback for moving robot parts, avoiding obstacles, manipulating objects in the environment, etc.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

A method for satellite component classification includes a satellite classification system receiving a test image depicting a satellite, the satellite having a hardware component configuration that is unknown to the satellite classification system. The test image is input to a satellite classification model trained, based at least in part on a plurality of training satellite images, to generate output image segmentation maps for input satellite images. The satellite classification model outputs an output image segmentation map for the test image, one or more position parameters for the satellite, and one or more attitude parameters for the satellite. The output segmentation map includes a plurality of map pixels corresponding to a plurality of image pixels in the test image, wherein pixel values of the plurality of map pixels classify corresponding image pixels of the test image as depicting different hardware components of the satellite.

The features, functions, and advantages that have been discussed can be achieved independently in various embodiments or can be combined in yet other embodiments, further details of which can be seen with reference to the following description and drawings.

DETAILED DESCRIPTION

Figure 1:
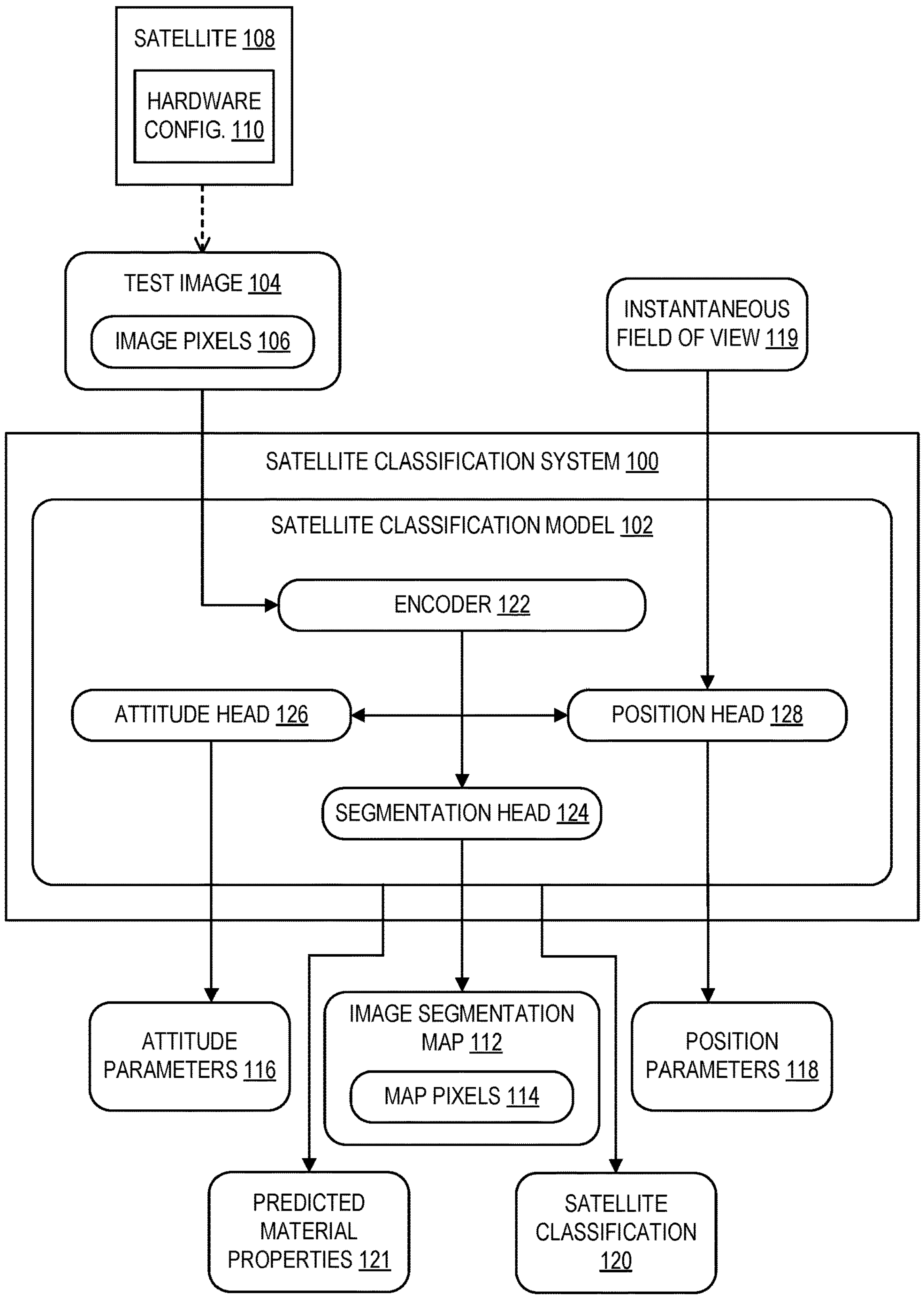
FIG. 1 schematically shows an example satellite classification system.

The present disclosure is directed to techniques for image segmentation. In particular, the present disclosure describes a satellite classification system useable to generate image segmentation maps for input images depicting satellites, referred to as test images. In other words, for a test image depicting a satellite, the satellite classification system outputs an image segmentation map labeling different pixels of the input test image as corresponding to different hardware components of the satellite. The satellite classification system additionally outputs position parameters and attitude parameters, which define the position and orientation (e.g., a six degree-of-freedom "pose") of the satellite as depicted in the test image. The techniques described herein are primarily described with respect to one "test image," although it will be understood that this is non-limiting. Rather, the techniques are applicable to any suitable number of one or more test images, and may in some cases be applied to frames of a digital video depicting a satellite. In other words, the present disclosure applies to any cases where at least one test image is received, but can be applied to any suitable number of test images sequentially or simultaneously.

In this manner, for a given image of a satellite, the satellite classification system may output an image segmentation map labelling different components of the satellite (e.g., the satellite body, solar panels, antennas, thrusters), and an indication of the pose of the satellite within the test image. Such information may beneficially be used in various suitable ways. As one non-limiting example, the techniques described herein may be used to facilitate satellite and/or spacecraft navigation, such as Rendezvous and Proximity Operations (RPOs) and/or Guidance, Navigation, and Control (GNC) operations. For instance, based on an input test image depicting a satellite, an autonomous spacecraft may control its own trajectory to dock with the satellite, or avoid a collision with the satellite, move closer to the satellite to inspect a particular component, etc.

Notably, unlike conventional image segmentation techniques that depend on prior knowledge of the satellite's hardware configuration to classify its various components accurately, the disclosed techniques are useable to generate image segmentation maps for satellites having unknown hardware component configurations. This independence from prior knowledge of hardware configurations beneficially enhances its utility in scenarios where detailed information about the satellite is not available—e.g., in the case of newly launched or unidentified satellites. Consequently, the techniques described herein represent an improvement to the field of satellite image analysis, providing a flexible and robust tool for segmenting satellite images for various applications, including monitoring, analysis, and space exploration efforts, where no a priori knowledge of the satellite is available.

FIG. 1 schematically shows an example satellite classification system 100 used to implement any or all of the satellite image segmentation techniques described herein. Satellite classification system 100 may be implemented via any suitable combination of computer hardware components. As one example, satellite classification system 100 may take the form of a server computer. In other examples, the satellite classification system may take another suitable form, such as a personal computer. In some examples, aspects of satellite classification system 100 may be distributed between two or more different computing devices. In general, satellite classification system 100, as well as the other computing devices described herein, has any suitable capabilities, hardware configuration, and form factor. Any or all of the computing devices described herein, including satellite classification system 100, may in some cases be implemented as computing system 700 described below with respect to FIG. 7.

As shown in FIG. 1, satellite classification system 100 is used to implement a satellite classification model 102. The satellite classification model is implemented as any suitable combination of computer software, hardware, and/or firmware components usable to output image segmentation maps based on input test images depicting satellites. In some examples, the satellite classification model is implemented through suitable machine learning (ML) and/or artificial intelligence (AI) techniques. As non-limiting examples, the satellite model generation system may be implemented as a neural network, such as a deep neural network (DNN), convolutional neural network (CNN), a U-net model, etc. In some examples, other types of ML models may be used in addition to, or instead of, neural network-based models, such as support vector machines (SVMs), random forest models, k-means clustering, etc.

The satellite classification system receives a test image 104 depicting a satellite. The test image includes a plurality of image pixels 106. It will be understood that a test image may take any suitable form and have any suitable image properties. For instance, the test image may be an RGB image, a black-and-white image, a grayscale image, and may have any suitable resolution. The test image may correspond to any suitable spectrum of illumination light (e.g., visible light, infrared light, ultraviolet light), and the satellite may have any suitable size and pose within the test image (e.g., position, orientation). In some examples the test image may depict two or more different satellites. Furthermore, the satellite classification system 100 may receive any suitable number of one or more different test images, which may each depict the same satellite (e.g., from different viewpoints), and/or depict different satellites.

In the example of FIG. 1, the test image 104 depicts a satellite 108 having a hardware configuration 110. A "hardware configuration" refers to the specific arrangement of physical hardware components and/or simulated hardware components that form the satellite. Satellites may include, as non-limiting examples, a satellite body, one or more solar panels, one or more antennas, one or more thrusters, imaging equipment, and/or various other suitable satellite components. A hardware configuration may refer to the types of components included in the satellite, the shapes and sizes of each component (e.g., the shape of the satellite body, the size of the solar panels), the manner in which the different components are attached to one another (e.g., the attachment position of the solar panels relative to the satellite body, whether the solar panels are attached directly to the satellite body or attached via an intermediary structural element), material properties of the satellite components, etc.

In some examples, the test image 104 depicts a physical, real-world satellite. For instance, the test image may be captured by a suitable real-world camera, and then received at the satellite classification system from the camera or from another suitable computing device communicatively coupled with the camera. In some examples, the test image depicts a simulated, virtual satellite. In such cases, the hardware configuration may be a simulated hardware configuration—e.g., as defined by a 3D digital model representing a real or hypothetical satellite.

In some examples, the techniques described herein may be used to determine the shape, dimensions, and/or relative positions of parts identified in segmentation maps depicting satellites. Through the application of machine vision processing techniques, segmentation maps may be analyzed to extract geometric information regarding each segmented part. This may include the evaluation of contours, edges, and/or other defining features to ascertain dimensions and shapes. Additionally, or alternatively, the system may use deep neural network architectures, trained on datasets of satellite imagery, to directly infer the spatial orientation and relative positioning of the parts within the segmentation map. This approach, combining machine vision and/or deep learning, can beneficially provide accurate and robust interpretation of satellite parts, facilitating their identification and analysis in a wide range of applications.

According to the techniques described herein, the hardware configuration of a particular satellite depicted in a test image is at least partially unknown to the satellite classification system. While the satellite classification system 100 may have general information as to the types of components typically included in satellites (e.g., satellite body, solar panels, antennas), the satellite classification system does not know in advance which specific configuration is used by the specific satellite depicted in the test image. For instance, the satellite classification system may not have information relating to the specific types of satellite components included in the satellite, the shapes and sizes of such components, the manner in which such components are attached to one another, etc. Nonetheless, in one potential advantage and as will be described in more detail below, an image segmentation map may be generated for the test image that labels different pixels of the test image as depicting different satellite components. This differs from other techniques used to generate image segmentation maps, which generally rely on the hardware configuration of the satellite to be already known by the classification system—e.g., the input image is segmented according to the known configuration.

In FIG. 1, the test image 104 is input to the satellite classification model 100. As will be described in more detail below, the satellite classification model is trained, based at least in part on a plurality of training satellite images, to generate output image segmentation maps for input satellite images. Thus, in FIG. 1, satellite classification model 102 outputs an output image segmentation map 112. The output image segmentation map includes a plurality of map pixels 114 corresponding to at least a portion of the plurality of image pixels 106 of the test image. Pixel values of the plurality of map pixels classify corresponding image pixels of the test image as depicting different hardware components of the satellite.

It will be understood that an image segmentation map may be "output" in various suitable ways depending on the implementation. In some embodiments, outputting the image segmentation map includes passing the image segmentation map to a downstream application (e.g., for further processing, for control of satellite navigation), transmitting the image segmentation map to another computing device, writing the image segmentation map to a data file, storing the image segmentation map in non-volatile storage of the computing device, and/or storing the image segmentation map in an external storage device communicatively coupled with the computing device.

In practical terms, an image segmentation map can be visualized as a colored or grayscale image where each unique label or segment is represented by a distinct color or shade. In general, an "image segmentation map" is a digital representation of an image where each pixel is assigned a label that identifies the pixel as belonging to a specific segment or category within the image. The "label" for each pixel is defined at least in part by the value for the pixel. For instance, each pixel having a certain value (e.g., zero) may correspond to one type of satellite component, while pixels having another value (e.g., one) may correspond to another type of satellite component. In some examples, different components, segments, and/or other groups of pixels in an image segmentation map having the same map pixel value may be assigned different identifiers, such as human-readable labels (e.g., "solar panel"), unique identifier values, etc. In some examples, the different segments in the image segmentation map are only distinguished by their differing map pixel values—e.g., different components of a satellite may be represented in the image segmentation map with different pixel values, without applying any additional categories or labels to such components.

Figure 2:
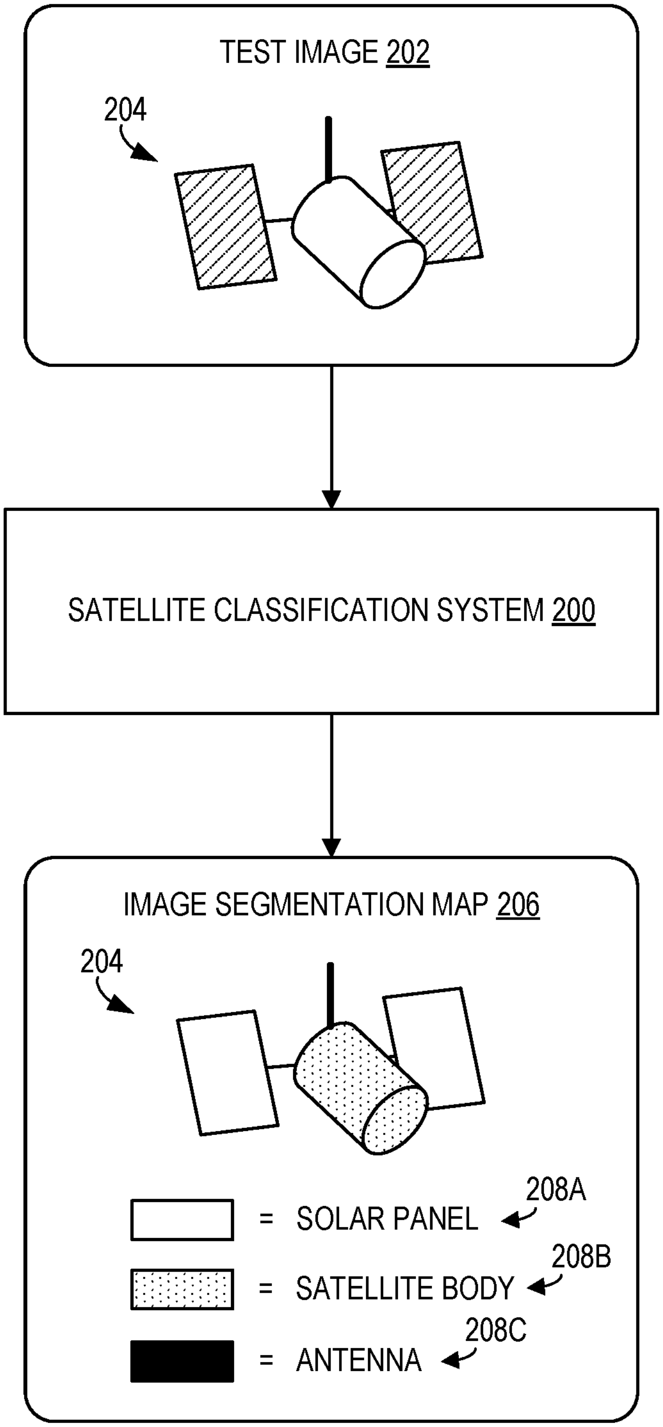
FIG. 2 schematically illustrates a satellite classification system outputting an example image segmentation map.

Generation of an image segmentation map is schematically illustrated in more detail with respect to FIG. 2. Specifically, FIG. 2 schematically shows another example satellite classification system 200, which receives a test image 202 depicting a satellite 204. It will be understood that the specific appearance of satellite 204, along with other satellites described herein, is highly simplified and non-limiting. In general, a "satellite" refers to a spacecraft designed to orbit the Earth and/or another celestial body. This can include communications satellites, global positioning system (GPS) satellites, picosatellites, rocket bodies, space stations, etc. A satellite may include any suitable number and variety of individual components, such as a satellite body, solar panels, antennas, thrusters, etc., which each may take any suitable form—e.g., having any suitable sizes, appearances, and structural relationships relative to one another. In other words, the techniques described herein are applicable to a wide variety of different types of satellite configurations, including additional or alternative subcomponents to those described herein. It will be understood that, in some cases, the techniques described herein may be applied to non-orbital spacecraft designed for deep space, travel from one celestial body to another, and/or any other suitable purpose.

Based on the test image, the satellite classification system 200 outputs an image segmentation map 206. Map pixels of the image segmentation map are used to label different hardware components detected in satellite 204. In FIG. 2, this is represented by the labels 208A, 208B, and 208C associating different pixel values of the image segmentation map with different types of satellite components. In particular, this includes a solar panel label 208A, a satellite body label 208B, and an antenna label 208C.

It will be understood that the specific representation of image segmentation map 206 shown in FIG. 2 is highly simplified and presented only for the sake of illustration. For instance, it will be understood that the human-readable labels 208A-C are provided only for explanation and need not be included in image segmentation maps generated as described herein. Furthermore, it will be understood that an image segmentation map need not be rendered or presented on a computer display for viewing. Rather, in some cases, the image segmentation map may take the form of a digital data structure that is stored and processed by a computing device without being graphically rendered for viewing by humans.

In the example of FIG. 2, for pixels in the test image depicting hardware components of the same component type, corresponding map pixels in the output image segmentation map have the same pixel value. This may be referred to as semantic image segmentation, where individual pixels are classified into a predefined category, without distinguishing between different objects of the same category. For instance, satellite 204 includes two different solar panels attached to the satellite body, each having a similar appearance in test image 202. In image segmentation map 206, each of these two solar panels are represented using the same pixel values—e.g., white, in this example—as the two solar panels are of the same component type.

Figure 3:
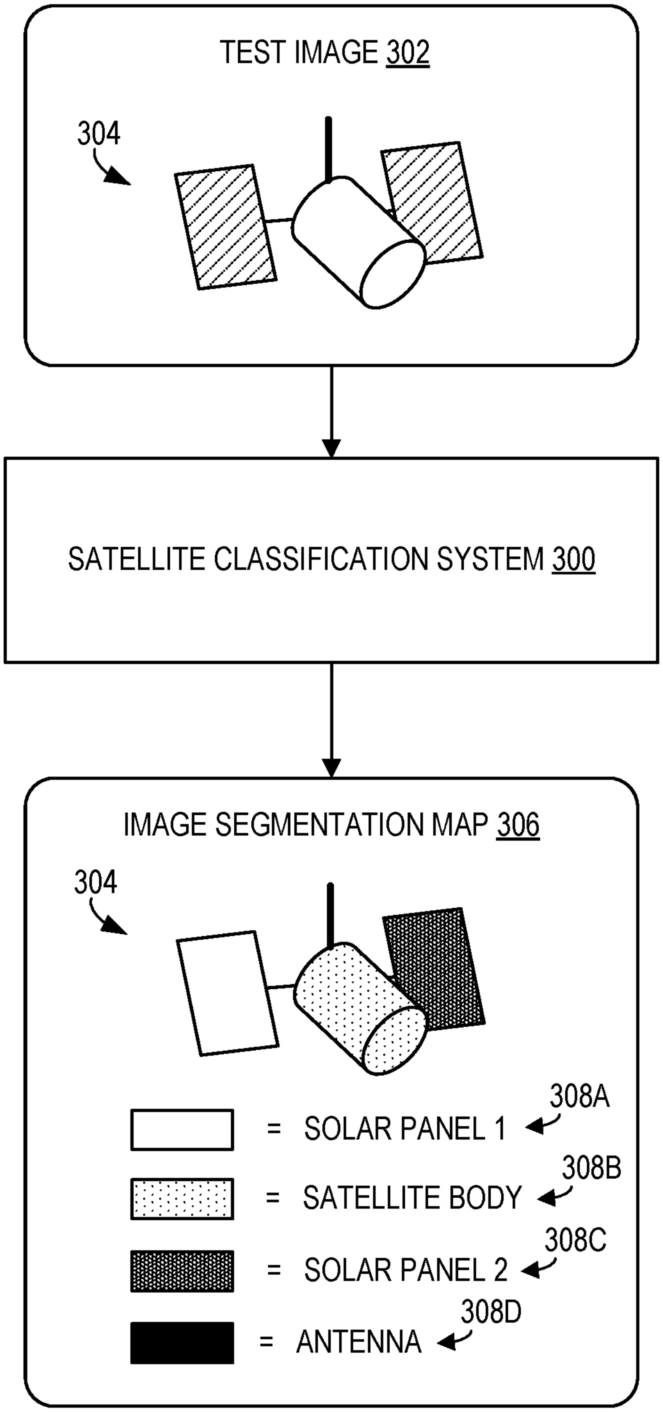
FIG. 3 schematically illustrates a satellite classification system outputting another example image segmentation map.

However, this need not always be the case. FIG. 3 schematically shows another example scenario where an image segmentation map is generated for a test image depicting a satellite. Specifically, FIG. 3 schematically shows another example satellite classification system 300, which receives a test image 302 depicting a satellite 304. The satellite classification system outputs an image segmentation map 306. Map pixels of the image segmentation map are used to label different hardware components detected in satellite 304. In FIG. 3, this is represented by the labels 308A, 308B, 308C, and 308D associating different pixel values of the image segmentation map with different types of satellite components. In particular, this includes two labels 308A and 308C corresponding to different solar panels, along with a label 308B for the satellite body and a label 308D for the antenna.

In other words, in this example, the two different solar panels are each different instances of the same hardware component type (e.g., solar panels). In the image segmentation map, the corresponding map pixels represent the different instances with different pixel values, in contrast to FIG. 2 where the different solar panel instances are represented with the same pixel values. This may be referred to as instance-based segmentation, which extends semantic segmentation by not only classifying each pixel into a category but also distinguishing between different instances of the same category.

Returning briefly to FIG. 1, in some examples, the satellite classification model outputs various types of information in addition to the image segmentation map for the test image. For instance, in FIG. 1, the satellite classification model additionally outputs one or more attitude parameters 116 for the satellite, and one or more position parameters 118 for the satellite. Each of the attitude parameters and position parameters may take any suitable form. As discussed above, in some examples, the attitude and position parameters together define a six degree-of-freedom pose of the satellite within the test image.

The attitude parameters may define the orientation of the satellite in any suitable way and with any suitable degree of precision. For instance, the attitude parameters may specify any or all of the satellite's roll (e.g., rotation around the satellite's longitudinal axis), the satellite's pitch (e.g., rotation around the satellite's lateral axis), and the satellite's yaw (e.g., rotation around the satellite's vertical axis). These values may be expressed in any suitable way. For instance, attitude parameters may be expressed as Euler angles, quaternion vectors, rotation matrices, rotation vectors, etc.

Similarly, the position parameters may define the position of the satellite in any suitable way and with any suitable degree of precision. For instance, the position parameters may define the position of the satellite within a coordinate system of the test image (e.g., pixel coordinates relative to a two-dimensional pixel grid of the test image). Additionally, or alternatively, the position parameters may define the position of the satellite relative to another coordinate system. For instance, the position parameters may define any or all of an altitude of the satellite (e.g., relative to the Earth's surface or another reference level), latitude and longitude coordinates of the satellite, a set of orbital parameters defining the orbit of the satellite (e.g., semi-major axis, eccentricity, inclination, etc.). In some examples, the position parameters for the satellite may be defined relative to a coordinate system of the camera used to capture the test image.

As discussed above, in some examples, the techniques described herein may be used to determine the shape, dimensions, and/or relative positions of parts identified in segmentation maps depicting satellites. Through the application of machine vision processing techniques, segmentation maps may be analyzed to extract geometric information regarding each segmented part—e.g., the position and/or orientation of each part with respect to the satellite body, with respect to the camera, and/or with respect to any other suitable coordinate system. This may include the evaluation of contours, edges, and/or other defining features to ascertain dimensions and shapes. Additionally, or alternatively, the system may use deep neural network architectures, trained on datasets of satellite imagery, to directly infer the spatial orientation and relative positioning of the parts within the segmentation map. This approach, combining machine vision and/or deep learning, can beneficially provide accurate and robust interpretation of satellite parts, facilitating their identification and analysis in a wide range of applications.

In some examples, the position and/or attitude parameters (and/or any other suitable information output by the satellite classification model) may be based on additional input data besides the test image depicting the satellite. For instance, in the example of FIG. 1, the satellite classification model additionally receives an instantaneous field of view (IFOV) 119 of the test image depicting the satellite. The one or more position parameters 118 are generated based at least in part on the IFOV.

In general, the IFOV refers to the angular extent of the area viewed by a single detector element of a sensing system (such as a camera) at a given instant. It can be described as the angle through which the sensor is sensitive to electromagnetic radiation from the observed scene. In some examples, the IFOV may be different in the vertical and horizontal directions of the image depending on camera design. The IFOV determines the spatial resolution of the sensor; a smaller IFOV corresponds to a higher spatial resolution, meaning the sensor can distinguish finer details. The IFOV can be used for calculating the position parameters of an observed object, such as a satellite, because it influences the scale and detail of the imagery captured. In one example scenario, using the IFOV and the altitude of the sensor platform (e.g., a satellite or aerial vehicle), the size of the area covered by each pixel of the sensor's image (often referred to as the ground sample distance, GSD) can be calculated. This can in turn be used to calculate the position parameters for the satellite. For instance, the resolution of the image is the product of the IFOV and range to the satellite object. If the IFOV is 10 micro-radians (10E-6 radians) and the range is 1000 meters, then the product is 0.01 meters corresponding to a 10 cm resolution.

In FIG. 1, in addition to the image segmentation map, the attitude parameters, and the position parameters, satellite classification model 102 additionally outputs a classification 120 of the satellite in the test image. In other words, in some examples, the satellite classification model is further trained to output a classification of the satellite depicted in the test image, thereby classifying the satellite as one of a plurality of recognized satellite types. It will be understood that a "recognized satellite type" may be specified with any suitable degree of granularity. For instance, in some examples, a recognized satellite type may refer to a general category of satellites, such as communication satellites, remote sensing satellites, global positioning system (GPS) satellites, cube satellites, picosatellites, expended rocket bodies, space stations, etc.

Additionally, or alternatively, a recognized satellite type may refer to a specific model of satellite. For instance, while the satellite classification may not know the hardware configuration of the satellite depicted in the test image in advance, the satellite classification system may store and/or otherwise have access to a database of different satellite configurations corresponding to different specific satellite models. Thus, in some examples, the satellite classification system may be configured to classify the satellite as being a recognized satellite model based on a determination that the observed hardware configuration in the test image is consistent with an existing satellite configuration.

Additionally, in FIG. 1, the satellite classification model outputs predicted material properties 121 for the satellite. In other words, in some examples, the satellite classification model outputs predicted material properties for one or more hardware component surfaces of the satellite depicted by the test image. As non-limiting examples, predicted material properties can include: reflectivity, relating to the ability of a surface to reflect light, which can indicate materials like metals or coated surfaces; texture, relating to the surface's smoothness or roughness, which can be indicative of different material types (e.g., a grid-like texture for solar panels); thermal properties, which may be observable in infrared-spectrum test images; and/or absorptivity, relating to the ability of a material to absorb radiation.

As discussed above, the satellite classification model may be implemented through any suitable ML and/or AI technologies. FIG. 1 includes simplified details for one non-limiting example architecture that may be used, where the satellite classification model includes an encoder 122. Additionally, the satellite classification model includes various decoder heads, including a segmentation head 124, an attitude head 126, and a position head 128. Each of these may take any suitable form depending on the implementation.

In one non-limiting example, the encoder includes a backbone for initial feature extraction and a neck that enhances these features. The backbone may be implemented as a hybrid convolutional-transformer model, including an input stem and four stages used to reduce the feature map size while increasing the channel depth. In one example, the feature map size for each stage of the backbone is $\frac{1}{4}$, $\frac{1}{8}$, $\frac{1}{16}$, and $\frac{1}{32}$ relative to the size of the input. The neck, attached to the last stage of the backbone, may be implemented as a CNN that refines the features to improve their discriminability for downstream tasks. In some examples, each stage of the backbone other than the last stage may be input to an average pooling operation and concatenated together as a vector, before being input to one or more decoder heads (such as the attitude head).

When included, the segmentation head may be implemented in any suitable way. As one example, the segmentation head may be implemented as a fully convolutional network (FCN). In one approach, the segmentation head receives features from the encoder (e.g., backbone and neck) and, using a super-resolution operation, upscales them to generate a full-size, per-pixel semantic segmentation map. The segmentation head may employ logits to estimate the probability of class membership for each pixel, where the predicted class for a pixel corresponds to the largest logit. In some examples, the segmentation head may be implemented with relatively less capacity than other prediction heads in the model to prevent posterior collapse.

When included, the position head may be implemented in any suitable way. Similar to the segmentation head, in some examples, the position head may be implemented as an FCN. In one approach, the position head calculates the satellite's position relative to the camera, factoring in horizontal and vertical shifts normalized against the image dimensions and the logarithm of the distance, which may be determined based on the IFOV as discussed above. The position head may begin with a single grouped 2D convolution, ensuring the receptive field encompasses the entire image, followed by multiple 1×1 convolutions that act similarly to linear layers.

When included, the attitude head may be implemented in any suitable way. As one non-limiting example, the attitude head may be implemented as a multilayer perceptron (MLP). For attitude estimation, the attitude head may represent 3D rotation through a 10-dimensional vector, which corresponds to a symmetric 4×4 matrix. The attitude may then be extracted by identifying the eigenvector associated with the smallest eigenvalue of this matrix. As one example, the attitude may be represented as a quaternion. In some examples, the model predicts the rotation of the camera with respect to the satellite, which can be inverted to produce an attitude quaternion.

In some examples, different head architectures may be tuned for efficient operation on embedded hardware. Activation functions for a neural network approach may be replaced with a Hard Swish function as follows:

$$f(x) = x\frac{ReLU6(x+3)}{6}, \text{ where } ReLU6(x) = \min(\max(0, x), 6)$$

This approach may improve execution on embedded hardware.

Figure 4:
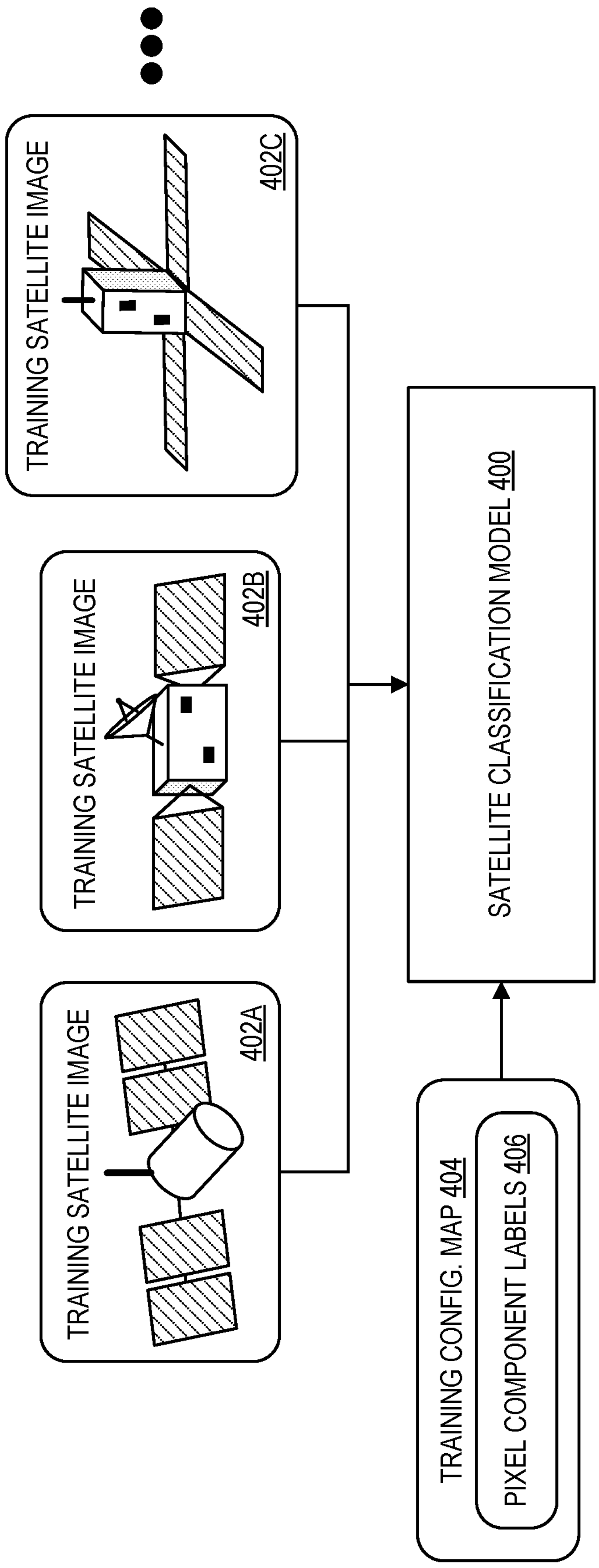
FIG. 4 schematically illustrates training a satellite classification model based on a plurality of training satellite images.

In general, the satellite classification model is trained to generate output segmentation maps based at least in part on a plurality of training satellite images. This is schematically illustrated with respect to FIG. 4, showing another example satellite classification model 400. As shown, the satellite classification model is trained based on a plurality of training satellite images, including images 402A, 402B, and 402C. It will be understood that a satellite classification model may be trained on any suitable number and variety of different training satellite images. These may beneficially represent a wide range of different satellite configurations—e.g., satellites having different shapes, sizes, roles, and arrangements of hardware components. Furthermore, the training satellite images may vary according to a plurality of imaging parameters—e.g., satellite pose, lighting conditions, a background scene, the spectrum of illumination light used to illuminate the satellite, etc.

In the example of FIG. 4, the satellite classification model is additionally trained based at least in part on a training configuration map 404, which includes a set of pixel component labels 406 corresponding to one or more of the training satellite images. This may represent a "ground truth" training set, identifying the satellite hardware components depicted by different pixels of a corresponding training satellite image. In some examples, a ground truth configuration map may be received for each training satellite image. Through a plurality of training passes, the satellite classification model may iteratively be trained such that, when provided with a training satellite image, the model generates an image segmentation map consistent with the training configuration map for that training satellite image.

In some examples, not every pixel of a given training satellite image is used for training the satellite classification model. For instance, in some examples, training the satellite classification model based at least in part on the plurality of training satellite images may include adding one or more pixels of the plurality of training satellite images to an exclusion set of pixels that are ignored during training. This may, for instance, include pixels depicting a background scene and not depicting a satellite in the training satellite image. Such pixels may be identified and added to the exclusion set in any suitable way. For instance, pixels depicting the background scene may be specified in the training configuration map corresponding to the training satellite image, and thus added to the exclusion set.

The training satellite images may take any suitable form and may be received from any suitable source. In some examples, the training satellite images include images captured by cameras and depicting real-world satellites—e.g., actual satellites orbiting the Earth. Additionally, or alternatively, the training satellite images may include computer-generated images depicting 3D satellite models. For instance, the training satellite images may be generated by a satellite model generation system configured to generate 3D satellite models for hypothetical satellite configurations, and then render image views of the 3D satellite models.

Figure 5:
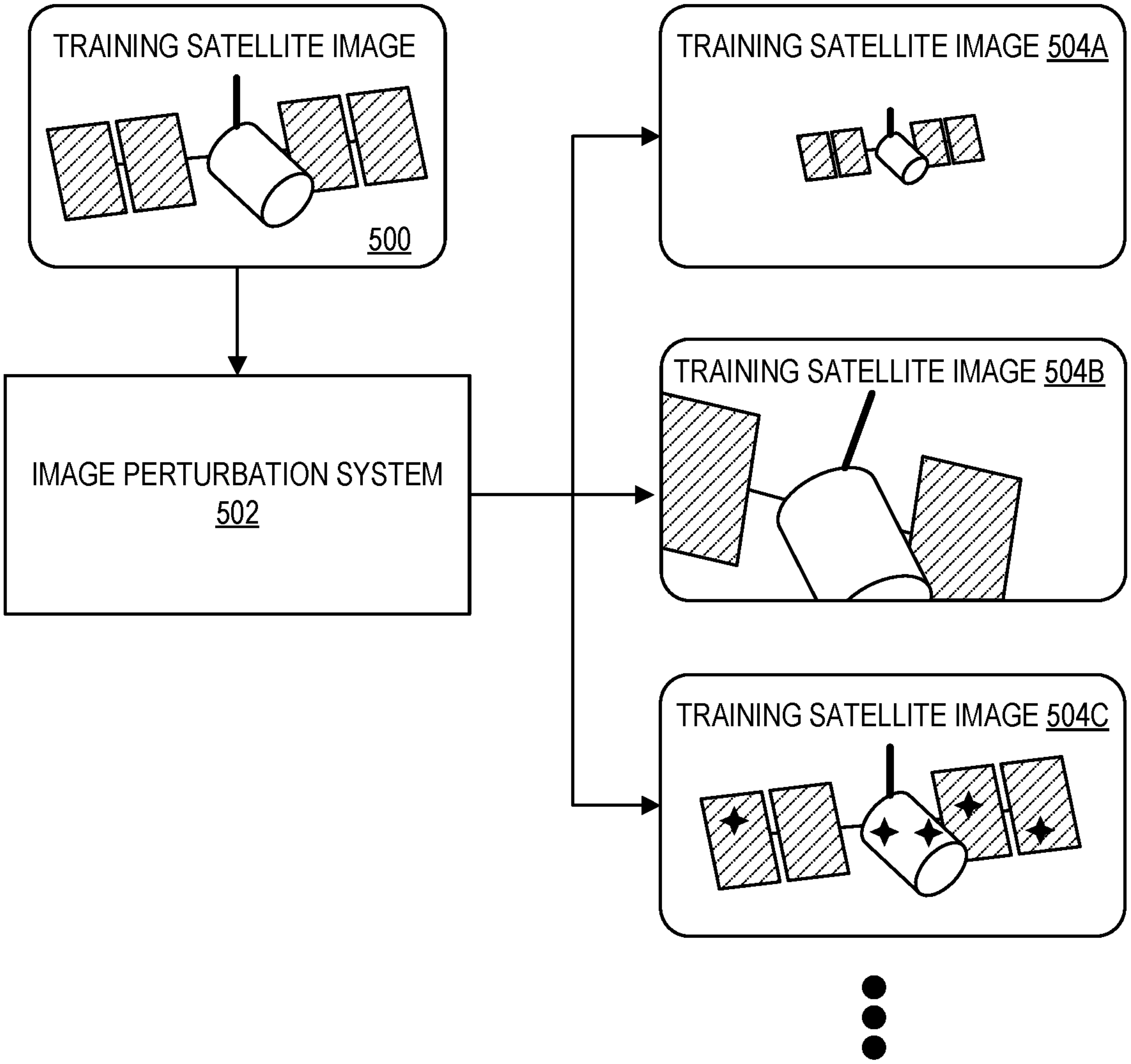
FIG. 5 schematically illustrates applying image perturbation operations to a training satellite image.

In some examples, training the satellite classification model based at least in part on the plurality of training satellite images may include applying one or more image perturbation operations to a training satellite image of the plurality of training satellite images. This is schematically illustrated with respect to FIG. 5, showing an example training satellite image 500. The training satellite image is input to an image perturbation system 502, which is configured to apply one or more image perturbation operations to the training satellite image. The image perturbation system then outputs a plurality of perturbed training images, including images 504A, 504B, and 504C. Each of these images have been modified in different ways as compared to the original training satellite image 500, which can serve to beneficially improve the diversity included in the training dataset and thereby improve the performance of the satellite classification model.

The image perturbation system may be implemented as any suitable combination of computer software, hardware, and/or firmware. For instance, in some examples, the image perturbation system takes the form of a software application (e.g., an image editing application) useable to apply various perturbation operations to input image data. The image perturbation system may be implemented by the same computing device that also implements the satellite classification mode, or a different computing device. In some examples, the image perturbation system may be implemented as computing system 700 described below with respect to FIG. 7.

It will be understood that any of a wide variety of different image perturbation operations may be applied to training satellite images. In some examples, the one or more image perturbation operations include: rescaling a training satellite depicted in the training satellite image; translating a position of the training satellite depicted in the training satellite image; rotating the training satellite; adding one or more simulated glints to the training satellite; adding quantized noise to the training image; and/or modifying pixel values of one or more pixels of the training image via one or more mathematical transformation functions. In FIG. 5, the size of the training satellite has been reduced in training satellite image 504A. In training satellite image 504B, the training satellite has been scaled and translated. In training satellite image 504C, simulated glints have been added to the training satellite. It will be understood that these training satellite images are non-limiting examples.

With respect to the example model architecture schematically illustrated with respect to FIG. 1 (e.g., including an encoder layer and various decoder heads), more specific details relating to one example approach for satellite classification model training will now be described. In this example, a variant of stochastic gradient descent may be employed, which can reduce the weighted sum of losses. This may include a learning schedule that adjusts both the learning rate and momentum. The training process may be phased, initially focusing on segmentation and attitude with mean squared error loss, before integrating geodesic loss for enhanced accuracy.

Different loss functions may be used for each modality predicted by the satellite classification model. For segmentation, cross entropy loss with label smoothing may be used. In some examples, a multiplicative increase is applied to a segmentation error of the segmentation head prior to summing the segmentation error with a position error and an attitude error for gradient descent optimization. For position parameters, the loss function may include the mean squared error (MSE) of the normalized position. For attitude, the MSE may be applied to the quaternion attitude representation, and also consider the geodesic loss (e.g., the angular distance between different rotation matrices). As one example, the attitude loss function may use an ambiguity correction method, where the truth is considered to be the possible rotation closest in geodesic distance to the model's estimate.

During training, in some examples, a dropout may be added between different head layers. "Dropout" refers to random zeroing of feature elements as a form of regularization to prevent overfitting. Additionally, or alternatively, during training, a drop path (also called stochastic depth) may be used between different stages of the backbone. This refers to a random bypassing of a block of layers by replacing them with a skip (residual) connection, which can help alleviate the vanishing gradient problem. The dropout probability may be linearly increased for each stage.

Figure 6:
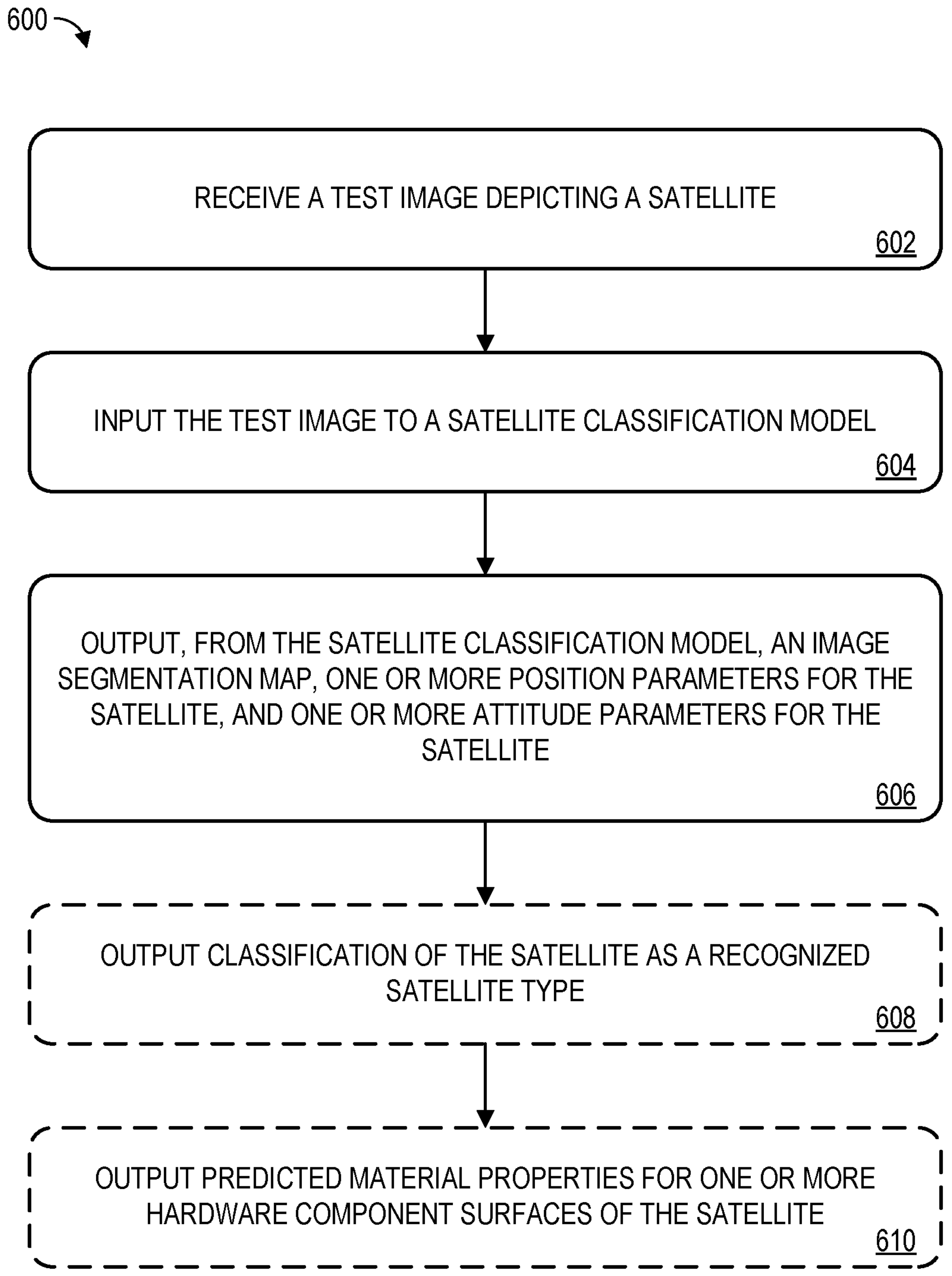
FIG. 6 illustrates an example method for satellite component classification.

FIG. 6 illustrates an example method 600 for satellite model generation. Steps of method 600 may be initiated, terminated, and/or repeated at any suitable time and in response to any suitable trigger. Method 600 is provided with reference to the example computing systems described herein and shown in FIGS. 1-5. In other examples, method 600 may be implemented by any suitable computing system of one or more computing devices. Any computing device performing steps of method 600 may have any suitable form factor, capabilities, and hardware configuration. In some examples, method 600 may be implemented by computing system 700 described below with respect to FIG. 7.

At 602, method 600 includes, at a satellite classification system, receiving a test image depicting a satellite. As discussed above, the satellite has a hardware configuration that is at least partially unknown to the satellite classification system. For instance, while the satellite classification system may have information relating to the types of components typically included in satellites, the satellite classification system does not know in advance the specific hardware configuration of the satellite depicted by the test image.

At 604, method 600 includes inputting the test image to a satellite classification model. The satellite classification model is previously trained to generate image segmentation maps for test images based at least in part on a plurality of training satellite images.

At 606, method 600 includes outputting, from the satellite classification model, an image segmentation map, one or more position parameters for the satellite, and one or more position parameters for the satellite. The image segmentation map labels different pixels in the test image as corresponding to different satellite hardware components. The position and attitude parameters of the satellite may collectively describe a pose of the satellite relative to the camera, or another suitable frame of reference.

At 608, method 600 optionally includes outputting a classification of the satellite as a recognized satellite type. As discussed above, this may include categorizing a general type of the depicted satellite, such as a communications satellite, GPS satellite, picosatellite, etc. Additionally, or alternatively, the satellite may be classified as a specific satellite model.

At 610, method 600 optionally includes outputting predicted material properties for one or more hardware component surfaces of the satellite. As discussed above, this may include various suitable material properties, such as reflectivity, texture, thermal properties, absorptivity, etc.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
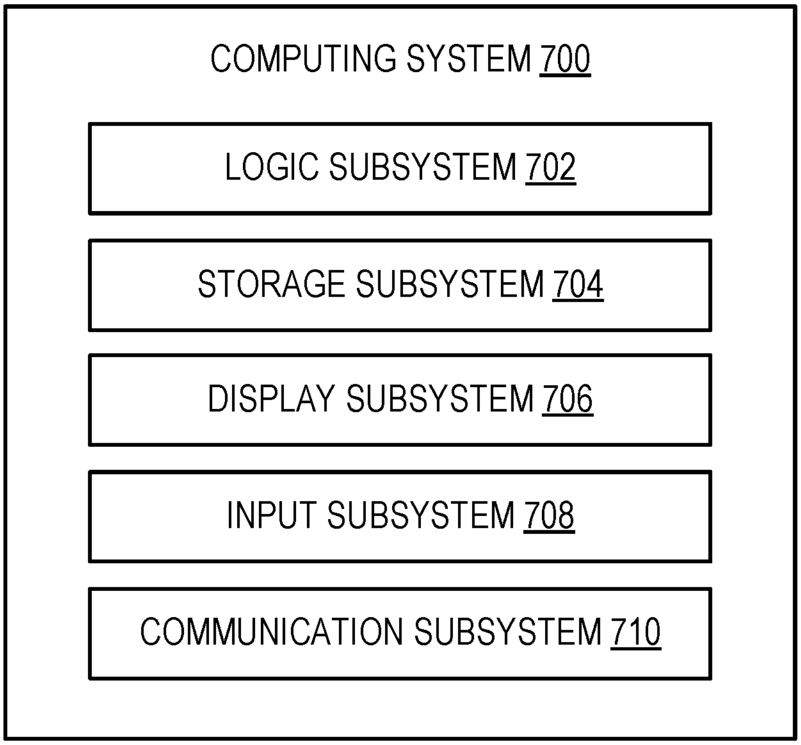
FIG. 7 schematically shows an example computing system.

FIG. 7 schematically shows a simplified representation of a computing system 700 configured to provide any to all of the compute functionality described herein. Computing system 700 may take the form of one or more network-accessible devices, personal computers, server computers, mobile computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information, such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

Further, the disclosure comprises configurations according to the following examples.

Example 1. A method for satellite component classification, the method comprising: at a satellite classification system, receiving a test image depicting a satellite, the satellite having a hardware component configuration that is unknown to the satellite classification system; inputting the test image to a satellite classification model, the satellite classification model trained, based at least in part on a plurality of training satellite images, to generate output image segmentation maps for input satellite images; and outputting, from the satellite classification model: an output image segmentation map for the test image, the output image segmentation map including a plurality of map pixels corresponding to a plurality of image pixels in the test image, wherein pixel values of the plurality of map pixels classify corresponding image pixels of the test image as depicting different hardware components of the satellite; one or more position parameters for the satellite; and one or more attitude parameters for the satellite.

Example 2. The method of example 1, wherein the satellite classification model includes a segmentation head, a position head, and an attitude head, and wherein during training of the satellite classification model, a multiplicative increase is applied to a segmentation error of the segmentation head prior to summing the segmentation error with a position error and an attitude error for gradient descent optimization.

Example 3. The method of example 1, wherein the satellite classification model is further trained to output a classification of the satellite depicted in the test image, thereby classifying the satellite as one of a plurality of recognized satellite types.

Example 4. The method of example 1, wherein, for image pixels in the test image depicting hardware components of a same component type, corresponding map pixels in the output image segmentation map have a same pixel value.

Example 5. The method of example 1, wherein, for image pixels in the test image depicting different instances of a same component type, corresponding map pixels in the output image segmentation map representing the different instances have different pixel values.

Example 6. The method of example 1, further comprising inputting an instantaneous field of view (IFOV) to the satellite classification model, and wherein the one or more position parameters are generated based at least in part on the IFOV.

Example 7. The method of example 1, wherein training the satellite classification model based at least in part on the plurality of training satellite images includes applying one or more image perturbation operations to a training satellite image of the plurality of training satellite images.

Example 8. The method of example 7, wherein the one or more image perturbation operations are selected from rescaling a training satellite depicted in the training satellite image, translating a position of the training satellite depicted in the training satellite image, and rotating the training satellite.

Example 9. The method of example 7, wherein the one or more image perturbation operations include adding one or more simulated glints to a training satellite depicted in the training satellite image.

Example 10. The method of example 7, wherein the one or more image perturbation operations include adding quantized noise to the training image.

Example 11. The method of example 7, wherein the one or more image perturbation operations include modifying pixel values of the one or more pixels using a mathematical transformation function.

Example 12. The method of example 1, wherein training the satellite classification model based at least in part on the plurality of training satellite images includes adding one or more pixels of the plurality of training satellite images to an exclusion set of pixels that are ignored during training.

Example 13. The method of example 1, further comprising outputting, from the satellite classification model, predicted material properties for one or more hardware component surfaces of the satellite depicted by the test image.

Example 14. The method of example 1, wherein the satellite classification model is a deep neural network (DNN).

Example 15. A satellite classification system, comprising: a logic subsystem; and a storage subsystem holding instructions executable by the logic subsystem to: receive a test image depicting a satellite, the satellite having a hardware component configuration that is unknown to the satellite classification system; input the test image to a satellite classification model, the satellite classification model trained, based at least in part on a plurality of training satellite images, to generate output image segmentation maps for input satellite images; and output, from the satellite classification model: an output image segmentation map for the test image, the output image segmentation map including a plurality of map pixels corresponding to a plurality of image pixels in the test image, and wherein pixel values of the plurality of map pixels classify corresponding image pixels of the test image as depicting different hardware components of the satellite; one or more position parameters for the satellite; and one or more attitude parameters for the satellite.

Example 16. The satellite classification system of example 15, wherein the satellite classification model includes a segmentation head, a position head, and an attitude head, and wherein during training of the satellite classification model, a multiplicative increase is applied to a segmentation error of the segmentation head prior to summing the segmentation error with a position error and an attitude error for gradient descent optimization.

Example 17. The satellite classification system of example 15, wherein the satellite classification model is further trained to output a classification of the satellite depicted in the test image, thereby classifying the satellite as one of a plurality of recognized satellite types.

Example 18. The satellite classification system of example 15, wherein, for image pixels in the test image depicting hardware components of a same component type, corresponding map pixels in the output image segmentation map have a same pixel value.

Example 19. The satellite classification system of example 15, wherein, for image pixels in the test image depicting different instances of a same component type, corresponding map pixels in the output image segmentation map representing the different instances have different pixel values.

Example 20. The satellite classification system of example 15, wherein training the satellite classification model based at least in part on the plurality of training satellite images includes applying one or more image perturbation operations to a training satellite image of the plurality of training satellite images, and wherein the one or more image perturbation operations are selected from rescaling a training satellite depicted in the training satellite image, translating a position of the training satellite depicted in the training satellite image, rotating the training satellite, adding one or more simulated glints to the training satellite, adding quantized noise to the training image, and modifying pixel values of one or more pixels of the training image.

Example 21. The satellite classification system of example 20, wherein the one or more image perturbation operations include modifying pixel values of the one or more pixels using a mathematical transformation function.

Example 22. The satellite classification system of example 15, wherein training the satellite classification model based at least in part on the plurality of training satellite images includes adding one or more pixels of the plurality of training satellite images to an exclusion set of pixels that are ignored during training.

Example 23. The satellite classification system of example 15, further comprising outputting, from the satellite classification model, predicted material properties for one or more hardware component surfaces of the satellite depicted by the test image.

Example 24. A method for satellite classification, the method comprising: at a satellite classification system, receiving a test image depicting a satellite, the satellite having a hardware component configuration that is unknown to the satellite classification system; inputting the test image to a satellite classification model, the satellite classification model trained, based at least in part on a plurality of training satellite images, to generate output image segmentation maps for input satellite images; outputting, from the satellite classification model, an output image segmentation map for the test image, one or more position parameters for the satellite, and one or more attitude parameters for the satellite, the output image segmentation map including a plurality of map pixels corresponding to a plurality of image pixels in the test image, and wherein pixel values of the plurality of map pixels classify corresponding image pixels of the test image as depicting different hardware components of the satellite; and outputting a classification of the satellite depicted in the test image, thereby classifying the satellite as one of a plurality of recognized satellite types.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for satellite component classification, the method comprising:

at a satellite classification system, receiving a test image depicting a satellite, the satellite having a hardware component configuration that is unknown to the satellite classification system;

inputting the test image to a satellite classification model, the satellite classification model trained, based at least in part on a plurality of training satellite images, to generate output image segmentation maps for input satellite images; and outputting, from the satellite classification model:

an output image segmentation map for the test image, the output image segmentation map including a plurality of map pixels corresponding to a plurality of image pixels in the test image, wherein pixel values of the plurality of map pixels classify corresponding image pixels of the test image as depicting different hardware components of the satellite;

one or more position parameters for the satellite;

one or more attitude parameters for the satellite; and predicted material properties for one or more hardware component surfaces of the different hardware components of the satellite depicted by the test image.

2. The method of claim 1, wherein the satellite classification model includes a segmentation head, a position head, and an attitude head, and wherein during training of the satellite classification model, a multiplicative increase is applied to a segmentation error of the segmentation head prior to summing the segmentation error with a position error and an attitude error for gradient descent optimization.

3. The method of claim 1, wherein the satellite classification model is further trained to output a classification of the satellite depicted in the test image, thereby classifying the satellite as one of a plurality of recognized satellite types.

4. The method of claim 1, wherein, for image pixels in the test image depicting hardware components of a same component type, corresponding map pixels in the output image segmentation map have a same pixel value.

5. The method of claim 1, wherein, for image pixels in the test image depicting different instances of a same component type, corresponding map pixels in the output image segmentation map representing the different instances have different pixel values.

6. The method of claim 1, further comprising inputting an instantaneous field of view (IFOV) to the satellite classification model, and wherein the one or more position parameters are generated based at least in part on the IFOV.

7. The method of claim 1, wherein training the satellite classification model based at least in part on the plurality of training satellite images includes applying one or more image perturbation operations to a training satellite image of the plurality of training satellite images.

8. The method of claim 7, wherein the one or more image perturbation operations are selected from rescaling a training satellite depicted in the training satellite image, translating a position of the training satellite depicted in the training satellite image, rotating the training satellite, adding one or more simulated glints to the training satellite, adding quantized noise to the training image, and modifying pixel values of one or more pixels of the training image via one or more mathematical transformation functions.

9. The method of claim 1, wherein training the satellite classification model based at least in part on the plurality of training satellite images includes adding one or more pixels of the plurality of training satellite images to an exclusion set of pixels that are ignored during training.

10. The method of claim 1, wherein the satellite classification model is a deep neural network (DNN).

11. The method of claim 1, wherein the predicted material properties include data pertaining to one or more of material reflectivity, texture, thermal properties, and absorptivity for the one or more hardware component surfaces of the different hardware components.

12. A satellite classification system, comprising:

a logic subsystem; and a storage subsystem holding instructions executable by the logic subsystem to:

receive a test image depicting a satellite, the satellite having a hardware component configuration that is unknown to the satellite classification system;

input the test image to a satellite classification model, the satellite classification model trained, based at least in part on a plurality of training satellite images, to generate output image segmentation maps for input satellite images; and output, from the satellite classification model:

an output image segmentation map for the test image, the output image segmentation map including a plurality of map pixels corresponding to a plurality of image pixels in the test image, and wherein pixel values of the plurality of map pixels classify corresponding image pixels of the test image as depicting different hardware components of the satellite;

one or more position parameters for the satellite;

one or more attitude parameters for the satellite; and predicted material properties for one or more hardware component surfaces of the different hardware components of the satellite depicted by the test image.

13. The satellite classification system of claim 12, wherein the satellite classification model includes a segmentation head, a position head, and an attitude head, and wherein during training of the satellite classification model, a multiplicative increase is applied to a segmentation error of the segmentation head prior to summing the segmentation error with a position error and an attitude error for gradient descent optimization.

14. The satellite classification system of claim 12, wherein the satellite classification model is further trained to output a classification of the satellite depicted in the test image, thereby classifying the satellite as one of a plurality of recognized satellite types.

15. The satellite classification system of claim 12, wherein, for image pixels in the test image depicting hardware components of a same component type, corresponding map pixels in the output image segmentation map have a same pixel value.

16. The satellite classification system of claim 12, wherein, for image pixels in the test image depicting different instances of a same component type, corresponding map pixels in the output image segmentation map representing the different instances have different pixel values.

17. The satellite classification system of claim 12, wherein training the satellite classification model based at least in part on the plurality of training satellite images includes applying one or more image perturbation operations to a training satellite image of the plurality of training satellite images, and wherein the one or more image perturbation operations are selected from rescaling a training satellite depicted in the training satellite image, translating a position of the training satellite depicted in the training satellite image, rotating the training satellite, adding one or more simulated glints to the training satellite, adding quantized noise to the training image, and modifying pixel values of one or more pixels of the training image.

18. The satellite classification system of claim 12, wherein training the satellite classification model based at least in part on the plurality of training satellite images includes adding one or more pixels of the plurality of training satellite images to an exclusion set of pixels that are ignored during training.

19. The satellite classification system of claim 12, wherein the predicted material properties include data pertaining to one or more of material reflectivity, texture, thermal properties, and absorptivity for the one or more hardware component surfaces of the different hardware components.

20. A method for satellite component classification, the method comprising:

at a satellite classification system, receiving a test image depicting a satellite, the satellite having a hardware component configuration that is unknown to the satellite classification system;

inputting the test image to a satellite classification model, the satellite classification model trained, based at least in part on a plurality of training satellite images, to generate output image segmentation maps for input satellite images;

outputting, from the satellite classification model, an output image segmentation map for the test image, one or more position parameters for the satellite, one or more attitude parameters for the satellite, and predicted material properties for one or more hardware component surfaces of different hardware components of the satellite depicted by the test image, the output image segmentation map including a plurality of map pixels corresponding to a plurality of image pixels in the test image, and wherein pixel values of the plurality of map pixels classify corresponding image pixels of the test image as depicting the different hardware components of the satellite; and outputting a classification of the satellite depicted in the test image, thereby classifying the satellite as one of a plurality of recognized satellite types.

* * * * *